C. E. HAGAMAN.
Platform-Gear for Wagons.
No. 217,094. Patented July 1, 1879.
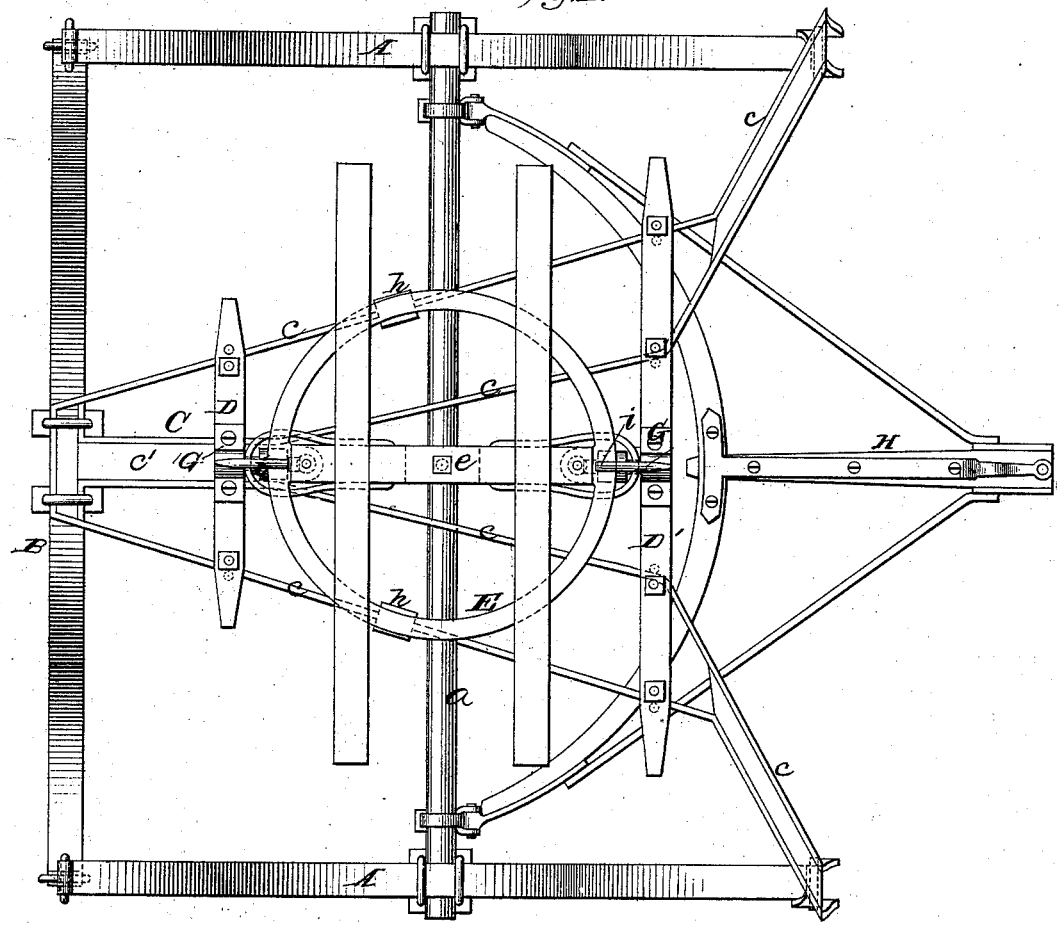
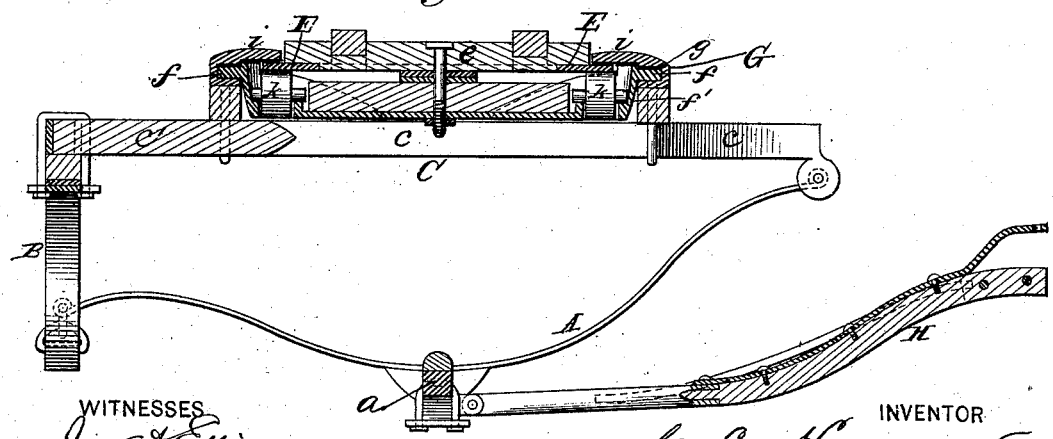
WITNESSES
INVENTOR
C. E. Hagaman
by E. W. Anderson.
his ATTORNEY

UNITED STATES PATENT OFFICE.

CYRUS E. HAGAMAN, OF HARVARD, ILLINOIS.

IMPROVEMENT IN PLATFORM-GEARS FOR WAGONS.

Specification forming part of Letters Patent No. 217,094, dated July 1, 1879; application filed May 17, 1879.

*To all whom it may concern:*

Be it known that I, CYRUS E. HAGAMAN, of Harvard, in the county of McHenry, and State of Illinois, have invented a new and valuable Improvement in Platform-Wagon Gears; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my improved platform-spring, and Fig. 2 is a vertical section thereof.

This invention has relation to improvements in platform-gear for vehicles, which combine lightness, cheapness, simplicity, and strength, and are adapted to conform to the oscillatory motion of the vehicle, so as to reduce friction, to prevent twisting, to equalize weight, and to give an easy traveling movement to the vehicle.

The nature of the invention consists in the construction and novel arrangement of parts, as hereinafter shown and described.

In the accompanying drawings, A A refer to the side springs, clipped centrally to the axle $a$; and B refers to an end spring, swivel-jointed to the rear ends of the side springs, and centrally clipped to the rear end of the frame C, supporting the fifth-wheel or circle. The forward or divergent ends of this frame are connected to and supported upon the same ends of the side springs A.

The frame C is of light construction and possesses great strength, it consisting of a number of edgewise-disposed metallic bars, $c$, $c$, put together somewhat in the form of an A, with their convergent ends fastened to a T-shaped bar, $c'$, to the cross of which and the embracing portions of the bars $c$ are connected the clips fastening that end of the frame to the end spring B. The divergent ends of this frame are formed by further deflecting the parallel bars thereof, and uniting or bolting together the ends of said parallel bars, with a piece of wood interposed between the said bars thereat, if desired.

D D' refer to two cross-bars spanning and clipped to the frame C at its forward and rear ends, respectively. E is the circle or fifth-wheel, carrying a frame, to which the vehicle-body is fastened. The circle E is pivoted or adjusted to a bolster, $e$, by a pivoting-bolt passing through the cross-piece of its frame and said bolster. The fifth-wheel bolster $e$ is itself pivoted or hung so as to have an oscillatory motion by means of projections or axes $f$, formed on boxes $f'$, fastened to said bolster, which axes fit in socket $g$ on plates G, fastened to the cross pieces or bars D D'. By this motion of the bolster $e$, which is transmitted to the fifth-wheel or circle, the latter is adapted to conform to the corresponding motion of the vehicle, and thus give the body a gentle, easy rocking motion, and break the concussion or jar which would otherwise be felt by the body, to the discomfort of the occupant and the damage of the body of the vehicle. This motion of the parts also serves, in a measure, in the capacity of a spring.

The movement of the oscillating fifth-wheel or circle E is limited by stops or headed plates $h$ fastened to the outside bars of the frame C, the concussion that would arise by the fifth-wheel striking the stops being overcome by the resiliency of the side springs. These stops also provide a traveling-surface for the fifth-wheel or circle in turning the vehicle.

Arms or projections $i$, cast or formed with the socketed plates G, bear or rest on the circle or fifth-wheel E, and confine it in position on its bolster. Friction-rolls $k$ are hung in the boxes $f'$ of the bolster $e$ for the fifth-wheel or circle to rest or move on and lessen friction. H is the tongue or draft-pole, connected directly to the axle.

Further advantages of this invention are lightness, cheapness, strength and simplicity, besides equalizing weight, giving an easier traveling motion, removing the weight from the center of the supporting-frame, and permitting the vehicle to be drawn directly from the axles instead of the springs, as heretofore, which interfered with the action of the springs.

Having thus fully described my invention, I claim and desire to secure by Letters Patent—

In platform-vehicle gear, the combination of the frame C, provided with stops $h$, cross-bars D D', provided with plates G, having sockets $g$ and arms or projections $i$, pivoted bolster $e$, having friction-rolls, and circle or fifth-wheel E, substantially as and for the purpose specified.

In testimony that I claim the above I have hereunto subscribed my name in the presence of two witnesses.

CYRUS EDWIN HAGAMAN.

Witnesses:
RICHARD J. WILSON,
F. MILLER.